United States Patent
Mbonye et al.

(10) Patent No.: US 10,735,903 B2
(45) Date of Patent: Aug. 4, 2020

(54) CLOUD-BASED EMERGENCY LOCATION SERVICE

(71) Applicant: Apple Inc., Cupertino, CA (US)

(72) Inventors: Gahima S. Mbonye, San Jose, CA (US); Ajaykumar S. Gupta, Sunnyvale, CA (US); Lakshmi N. Kavuri, Cupertino, CA (US); Abdul-Munem Al-Khudairi, Oakville (CA); Clive E. Rodgers, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/461,493

(22) PCT Filed: Dec. 20, 2016

(86) PCT No.: PCT/US2016/067832
§ 371 (c)(1),
(2) Date: May 16, 2019

(87) PCT Pub. No.: WO2018/118026
PCT Pub. Date: Jun. 28, 2018

(65) Prior Publication Data
US 2019/0335298 A1    Oct. 31, 2019

(51) Int. Cl.
*H04W 4/02* (2018.01)
*H04W 4/029* (2018.01)
*H04W 4/90* (2018.01)
*H04W 76/50* (2018.01)
*H04M 3/42* (2006.01)
*H04M 3/51* (2006.01)

(52) U.S. Cl.
CPC ....... *H04W 4/025* (2013.01); *H04M 3/42357* (2013.01); *H04M 3/5116* (2013.01); *H04W 4/029* (2018.02); *H04W 4/90* (2018.02); *H04W 76/50* (2018.02); *H04M 2203/6009* (2013.01)

(58) Field of Classification Search
CPC ....... H04W 4/025; H04W 4/029; H04W 4/90; H04W 76/50; H04M 3/42357; H04M 3/5116; H04M 2203/6009
USPC ........................ 455/404.1, 404.2, 456.1–457
See application file for complete search history.

(56) References Cited

U.S. PATENT DOCUMENTS 6,377,810 B1    4/2002  Geiger
7,623,447 B1 *  11/2009 Faccin ................. H04W 4/029
                                                370/230

(Continued)

*Primary Examiner* — Erica Navar
(74) *Attorney, Agent, or Firm* — Kowert, Hood, Munyon, Rankin & Goetzel, P.C.

(57) ABSTRACT

A method for a wireless UE device to utilize tokens and cloud service technology to facilitate the provision of location data to an emergency call center. The UE may provide cellular signaling to initiate an outgoing telephone call to an emergency call center. A token may be provided during the signaling, wherein the token is associated with location information of the UE device stored on a server computer (referred to as a cloud server or location server). The token may uniquely identify the UE device and/or a user cloud service account of the UE device. The call center may use the token to retrieve location information of the UE from the cloud server. The use of the token may also provide for enhanced security, e.g., to prevent spoofing of the UE phone number.

20 Claims, 10 Drawing Sheets

(56) References Cited

U.S. PATENT DOCUMENTS

| | | | |
|---|---|---|---|
| 8,000,678 B1* | 8/2011 | Klesper | H04M 11/04 455/404.1 |
| 2008/0052399 A1* | 2/2008 | Nguyen | H04L 12/66 709/227 |
| 2011/0296513 A1* | 12/2011 | Kasad | G06F 21/35 726/9 |
| 2012/0188941 A1 | 7/2012 | Li | |
| 2013/0252583 A1* | 9/2013 | Brown | H04W 12/06 455/411 |
| 2014/0282938 A1* | 9/2014 | Moisa | G06F 21/6218 726/6 |

* cited by examiner

CLOUD-BASED EMERGENCY LOCATION SERVICE

FIELD

The present disclosure relates to wireless devices, and more particularly to a system and method for enabling emergency location services.

DESCRIPTION OF THE RELATED ART

Wireless communication systems are rapidly growing in usage. In particular, cellular communication technology has become ubiquitous for telephony communication. One important use of cellular telephones is the ability to dial for assistance during an emergency. In many developed countries, emergency infrastructure exists such that an emergency call center is able to determine the location of a person making an emergency telephone call.

In many developing countries, however, emergency location service infrastructure has not been established. In these countries, when a person dials an emergency helpline, the emergency call center may not have an effective way to determine the location of the caller. Most emergency callers now dial from mobile devices, and as a result the location cannot be reliably correlated with a particular telephone number (e.g., as was possible with landline phones). Improving the speed and accuracy with which an emergency call center is able to ascertain the location of a caller can be life-saving in many circumstances.

Accordingly, improvements in emergency location service technology for wireless devices would be desirable.

SUMMARY

In light of the foregoing and other concerns, it would be desirable to provide a way for a wireless user equipment (UE) device with cellular communication capability to reliably and securely provide location information to an emergency call center.

Accordingly, embodiments are presented herein of a method for a wireless UE device to utilize cloud service technology to facilitate the provision of location data to an emergency call center. The UE may include one or more radios (e.g., including at least a cellular radio), including one or more antennas, for performing wireless communications. The UE device may also include a cellular modem. The UE device may also include a processing element configured to implement part or all of the method (e.g., by executing program instructions). In addition, the UE device may include a non-transitory computer accessible memory medium, which may store program instructions executable by the UE. In addition, the UE may communicate with a server that receives and stores location information of the UE, wherein the server may be a part of a cloud-based infrastructure that provides cloud-based services to the UE.

According to some embodiments, the wireless UE may provide signaling to initiate an outgoing telephone call to an emergency call center. In other words, the user may dial an emergency number, such as 911 in the U.S., on his cell phone to make an emergency call, typically over a cellular network. A token may be provided during the signaling, wherein the token is associated with location information of the UE device stored on a server computer (referred to as a cloud server or location server). In some embodiments, the token may be encapsulated in a calling party sub-address field of the outgoing telephone call. In other embodiments, the token may be transmitted by the UE to the call center using a user-to-user signal supplementary service. The token may uniquely identify the UE device and/or may uniquely identify a user cloud service account associated with the UE device. The use of the token may provide for enhanced security, e.g., to prevent spoofing of the UE phone number.

In some embodiments, the UE may request the token from a server (e.g., a cloud server), possibly in response to the emergency call being initiated, and in response to this request the server may generate and provide the token to the UE. The UE may also provide its location information (the location of the UE) to the server, also possibly in response to the emergency call being initiated, and the server may associate this location information with the token. In this manner, the token may be configured for use by the emergency call center to retrieve the location information of the UE device from the server computer. The UE device may also be configured to periodically provide location information updates to the server computer during the outgoing emergency telephone call to the emergency call center.

When the call center receives the incoming emergency call from the UE device, the call center may receive the token from the UE device, wherein the token is associated with location information of the UE device stored on the server computer as previously described. The call center may then request/receive the location information from the server using the token. The received location information is useable to determine a location of the UE device from which the incoming emergency call was received, and the call center may then transmit the location of the UE device to an emergency responder, or perform another action, as appropriate. The received location information may be displayed on a display device, e.g., in a map. In one embodiment, the emergency call center may create a uniform resource locator comprising the token, wherein the URL specifies a webpage (maintained on or by the cloud server) configured to display a map including the location information.

In some embodiments, where the respective country supports an emergency location service similar to the Advance Mobile Location (AML) standard, a mobile location server may be interposed between the emergency call center and the cloud server. In these embodiments, the emergency call center may request the location information using the token by providing the token to a mobile location server for provision to the cloud server. The location information may then be provided from the cloud server through the mobile location server to the call center.

As noted above, the cloud server (also called the location server) may store location information received from the UE device. Upon receipt of a request from the UE, such as when the UE initiates an emergency call, the cloud server may generate and store a token associated with a user equipment (UE) device, wherein the token identifies the UE device. The cloud server may further provide the token to the UE device for provision in the telephone call to the call center as described above. As previously discussed, the cloud server may receive the token from the call center in response to the UE device making the emergency telephone call to the call center, and in response provide the location information to the call center in response to the received token from the call center. As mentioned above, in providing the location information to the call center, the server may generate a webpage including a map containing the location information, wherein the webpage is accessible to the call center upon receipt of a URL containing the associated token.

BRIEF DESCRIPTION OF THE DRAWINGS

A better understanding of the present subject matter can be obtained when the following detailed description of the preferred embodiment is considered in conjunction with the following drawings, in which.

Figure 1:
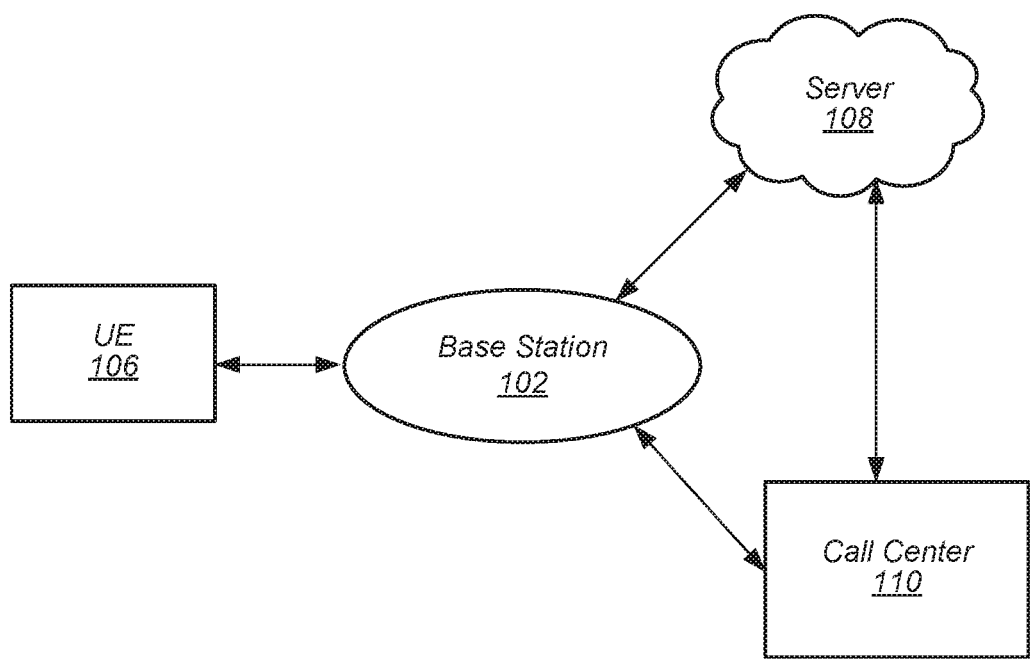
FIG. 1 illustrates an exemplary wireless communication system for enabling emergency location services, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that is mobile or portable and that performs wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, wherein the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Communication System

FIG. 1 illustrates an exemplary wireless communication system for enabling emergency location services, according to some embodiments. It is noted that the system of FIG. 1 is merely one example of a possible system, and embodiments may be implemented in any of various systems, as desired.

As shown, the exemplary wireless communication system includes a user equipment (UE) 106 and a base station (BS) 102. The user device 106 may be referred to as a UE or UE device. The UE 106 may be a device with wireless (e.g., cellular) network connectivity such as a mobile phone, a hand-held device, a computer or a tablet, an accessory device, or virtually any type of wireless device.

The base station 102 may provide cellular communication services to the UE 106. The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to wirelessly communicate with a server 108 (e.g., a cloud platform which provides cloud-based services to UEs, one example being an iCloud platform, or another type of server). Thus, the base station 102 may facilitate communication between the UE 106 and the server 108. In particular, the cellular base station 102 may provide the UE 106 with various telecommunication capabilities, such as voice and SMS services (e.g., typically via circuit-switched wireless links) and/or data services (e.g., typically via packet-switched wireless links).

The BS 102 may be further equipped to wirelessly communicate with a call center 110 (e.g., an emergency call center, a public-safety answering point (PSAP), or another type of call center). Thus, the base station 102 may facilitate communication between the UE 106 and the call center 110. The UE 106 may thereby be able to place a call (which may be an emergency call) to the call center 110 through the base station 102.

The UE 106 may be capable of communicating using multiple wireless communication standards. For example, the UE 106 may be configured to communicate using at least one wireless networking (e.g., Wi-Fi) and/or peer-to-peer wireless communication protocol (e.g., BT, Wi-Fi peer-to-peer, etc.) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

The server 108 may be configured to communicate directly with the call center 110. For example, the server and the call center may both be connected to the Internet, and may be configured to communicate with each other through the Internet. The server and the call center may additionally be configured to communicate by some other wireless communication technology, such as a cellular communication protocol and/or other wireless communication protocols.

Figure 2:
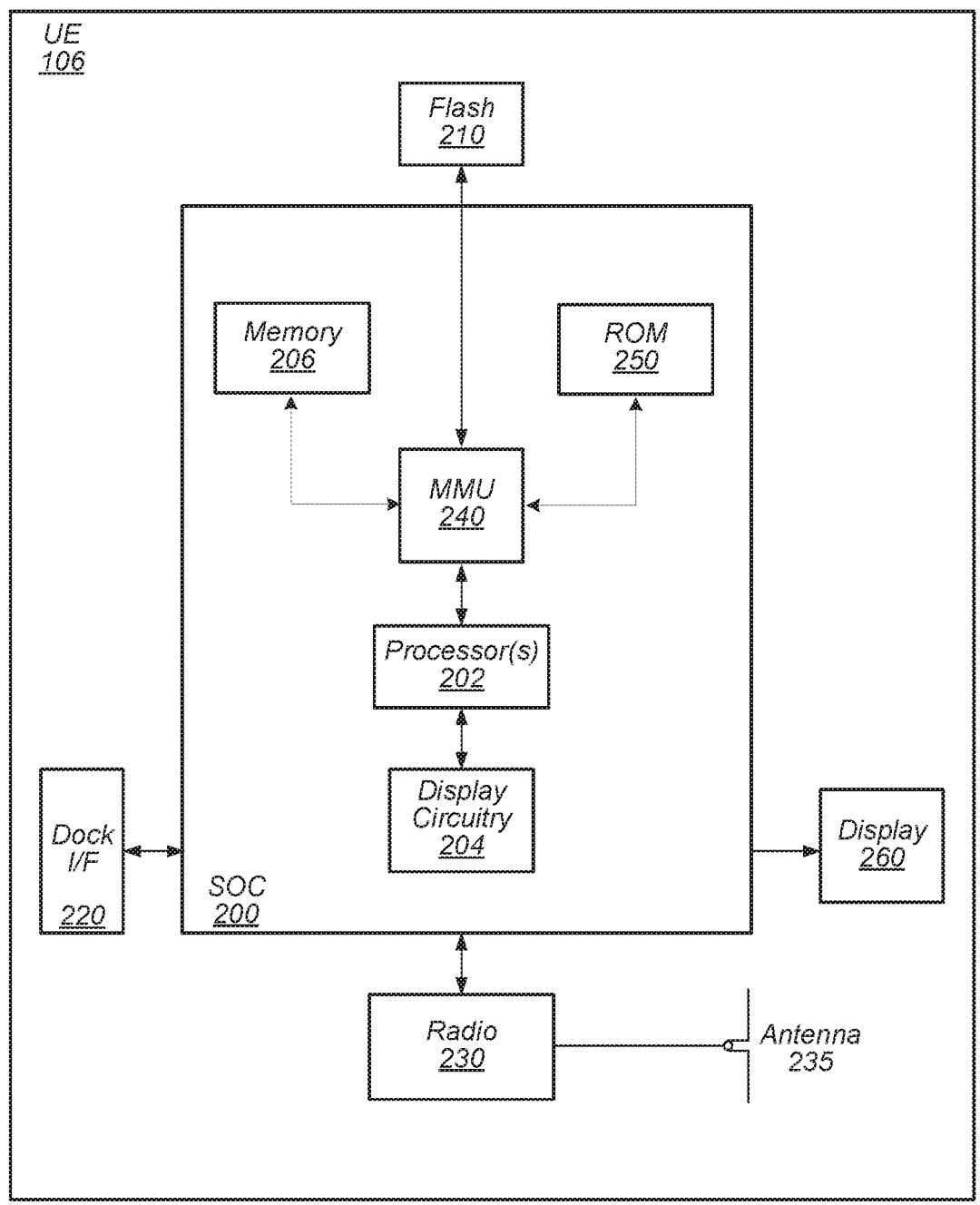
FIG. 2 illustrates an exemplary block diagram of a UE device, according to some embodiments.

FIG. 2—Exemplary Block Diagram of a UE

FIG. 2 illustrates an exemplary block diagram of a UE 106, according to some embodiments. The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, Wi-Fi, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT I 1×EV-DO I HRPD I eHRPD) or LTE using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios or radio components which are shared between multiple wireless communication protocols, and one or more radios or radio components which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible. The UE 106 may be configured to disable (e.g., to power down) the one or more radios and/or one or more radio components, for example to limit power consumption (such as during times of low device use).

As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, Flash memory 210) and/or to other circuits or devices, such as the display circuitry 204, wireless communication circuitry 230 (also referred to as a "radio"), connector I/F 220, and/or display 260. The MMU 240 may be configured to perform memory protection and page table translation or set up. In some embodiments, the MMU 240 may be included as a portion of the processor(s) 202.

As shown, the SOC 200 may be coupled to various other circuits of the UE 106. For example, the UE 106 may include various types of memory (e.g., including NAND flash 210), a connector interface 220 (e.g., for coupling to a computer system, dock, charging station, etc.), the display 260, and wireless communication circuitry (or "radio") 230 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry (radio(s)) 230 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 235 to perform the wireless communication.

The UE 106 may also include and/or be configured for use with one or more user interface elements. The user interface elements may include any of various elements, such as display 260 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for distributing a token to enable emergency location services. The processor 202 of the UE device 106 may be configured to implement part or all of the features described herein, e.g., by executing program instructions stored on a memory medium (e.g., a non-transitory computer-readable memory medium). Alternatively (or in addition), processor 202 may be configured as a programmable hardware element, such as an FPGA (Field Programmable Gate Array), or as an ASIC (Application Specific Integrated Circuit). Alternatively (or in addition), the processor 202 of the UE device 106, in conjunction with one or more of the other components may be configured to implement part or all of the features described herein, such as the features described below.

Figure 3:
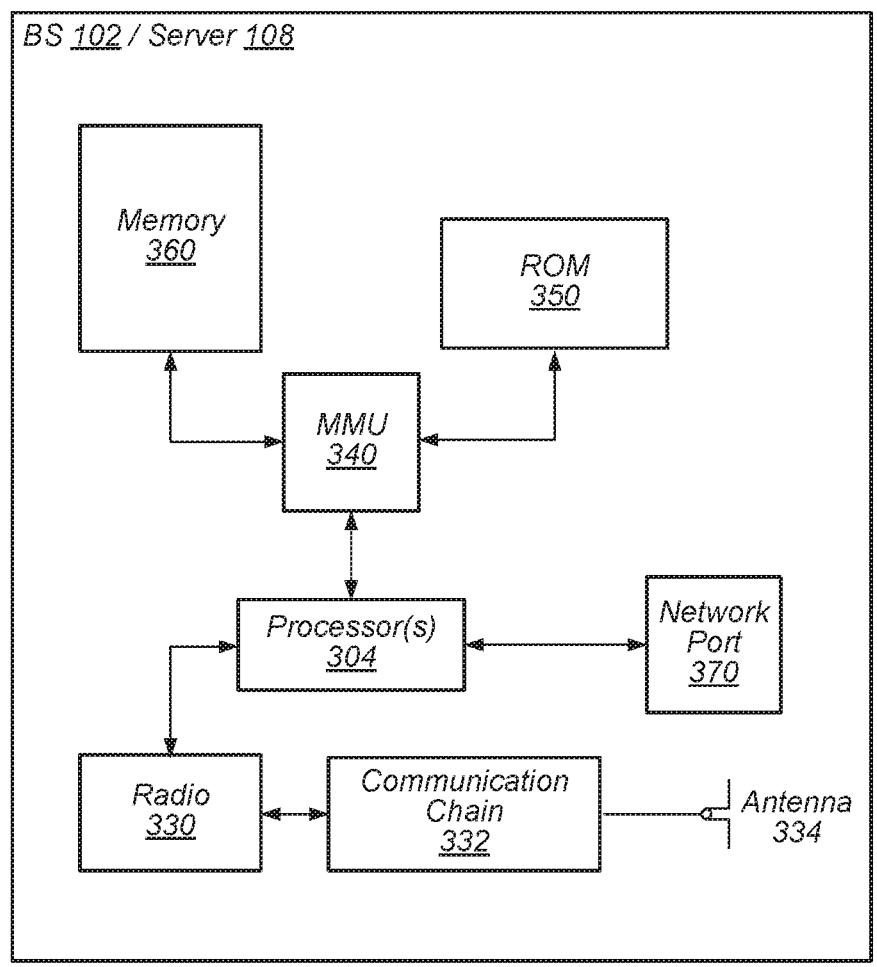
FIG. 3 illustrates an exemplary block diagram of a base station (BS), according to some embodiments.

FIG. 3—Exemplary Block Diagram of a Base Station or Server

FIG. 3 illustrates an exemplary block diagram of a cellular base station (BS) 102 or a server 108, according to some embodiments. The descriptions below are made in reference to the base station 102, but it may be understood that similar configurations of components are also possible for the server 108. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 540, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in reference to FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider). The base station 102 may also be coupled to an Emergency Alert System (EAS) via the network port 370, by which means the base station may receive emergency alert messages to distribute to cellular devices via cellular broadcast.

The base station 104 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless telecommunication standards, including, but not limited to, LTE, WCDMA, CDMA2000, etc.

The base station 102 may be configured to support provision by a UE 106 of messages received via cellular broadcast to other devices (e.g., devices without native cellular communication capabilities). In particular, as described further subsequently herein, the BS 102 may include hardware and software components for implementing (or for use in conjunction with a UE 106 implementing) part or all of a method for a UE 106 to provide indications of messages received by the UE 106 by way of cellular broadcast techniques to another device.

The processor 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

The server 108 may be configured in a comparable manner to the base station 102. In other words, a combination of any of the components from the block diagram in FIG. 3 may likewise be comprised within the server 108. Thus the server may comprise a processor, memory medium, communications capability, and any of various other components normally found in a server computer system. The server 108 may be a cloud platform, such as the iCloud platform offered by Apple, some other cloud platform, or some other kind of server that is configured to communicate with the UE 106 and the call center 110.

Figure 4:
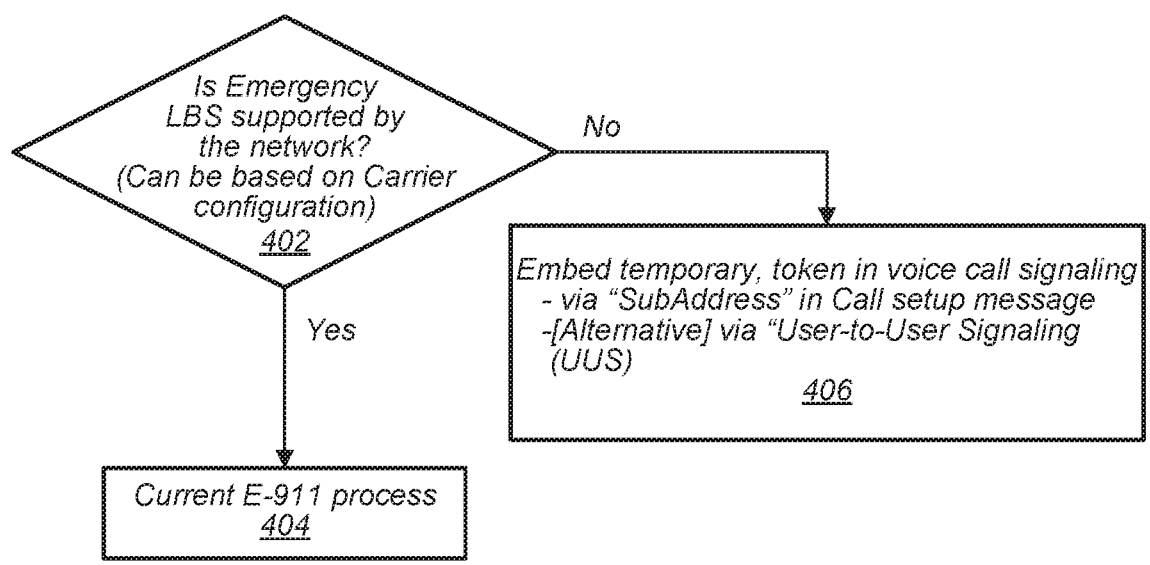
FIG. 4 is a high level flow diagram for initiating emergency location services, according to some embodiments.

FIG. 4—Flow Diagram for Initiating Emergency Location Services

FIG. 4 is a flow diagram illustrating an exemplary method for a UE to determine how to inform a call center (which may be an emergency call center or a public-safety answering point (PSAP)) of the UE's location, according to some embodiments. The methods below may be described in terms of an emergency call placed by a UE, but it may be understood that the methods described may equally apply to any call placed by a UE, wherein it is desirable for the called party to obtain location information for the calling party.

At 402, the UE 106 may determine whether an emergency location-based service (LBS) is supported by the network. For example, in some embodiments, this determination may be based on the configuration of the wireless technology carrier that is servicing the network. For example, the determination may be based on a bundle of services associated with the particular wireless technology carrier. For example, some wireless carriers may be queried to determine if emergency LBS services are supported in a bundle of services offered by the wireless carrier.

If it is determined that an emergency LBS is supported by the network, at 404, the UE 106 may proceed to use the current emergency location-based service. For example, in the United States, the UE 106 may proceed to use the current E-911 location process.

If the UE 106 determines that an emergency LBS is not supported by the network, at 406, the UE 106 may proceed to embed a temporary token in voice call signaling to the emergency call center. The token, as will be explained in greater detail below, may enable novel emergency location services, according to some embodiments. The token may also provide for more secure provision of location information and may prevent spoofing attacks. In some embodiments, the UE 106 may embed the token in the "SubAddress" of the call setup message. In some embodiments, the SubAddress may be based on the "Calling Line Identification Presentation Supplementary Service" standard, which is specified in 3GPP TS 24.081. In other embodiments, the UE 106 may embed the token using User-to-User signaling (UUS), via a "User-to-User Signaling (UUS) Supplementary Service" as defined in 3GPP 24.087.

Figure 5:
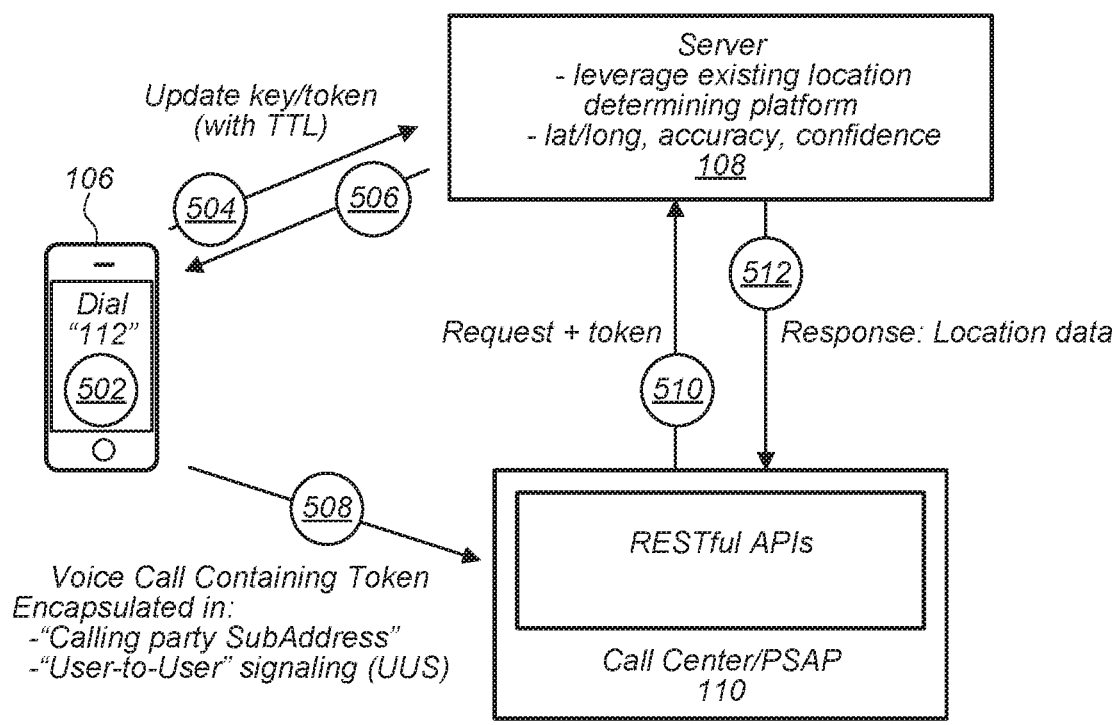
FIG. 5 is a flow diagram illustrating an exemplary method by which an emergency call center obtains location information of a mobile device, according to some embodiments.

FIG. 5—Flow Diagram for Performing Emergency Location Service

FIG. 5 is a flow diagram illustrating an exemplary method for performing emergency location services (ELS), according to some embodiments.

At 502, the user of the UE 106 may dial an emergency number on a cell phone (e.g., "112" in India or "911" in the U.S.). The dialing of an emergency number may be performed by the user manually entering the numbers on a keypad, by selecting a preconfigured button that places an emergency call, or by voice activated methods, among others.

In response to the user dialing the emergency number, at 504, the UE 106 may request a token, or an updated token, from the server 108. The server 108 may be a cloud platform, e.g., a cloud platform that provides cloud-based services to UEs, such as the iCloud platform, or another kind of server. In other embodiments, the UE may be configured to periodically obtain and store a token, independent of initiation of an emergency call. In these embodiments, the method may proceed directly to 508 without performing 504 and 506. In 504 the UE may automatically request the token in response to the emergency call having been initiated.

In some embodiments, the request 504 may additionally provide to the server location information for the UE, which may comprise latitude and longitude coordinates, accuracy, and confidence information. The location information may also take other forms, as desired, such as a street address, etc. In other embodiments, the location information for the UE may be provided to the server separately from the methods described herein, and not in response to the emergency call. For example, an independent application running on the UE (e.g., "Find My Phone", or some other application), may be configured to periodically transmit location information of the UE to the server 108, independent of the dialing of an emergency call 502. In some embodiments, the location information of the UE may have been obtained by UE prior to 504, using a global navigational satellite systems technology (e.g., GPS), base station triangulation, or some other means of determining location. In other embodiments, the location information may be obtained by the UE in response to the dialing of the emergency call 502.

In response to the request made by the UE at 504, at 506, the server 108 may provide a token to the UE, which may involve updating a previous token. The server 108 may automatically generate the token in response to receiving the request in 504, or the token may have been made previously. The token, which may also be referred to as a 'key', may comprise a short series of bits (less than 20 bytes) that may be generated by the server. The token may further comprise a unique identifier associated with the UE, or with a user account associated with the UE (e.g., a user cloud service account associated with the UE). The token may comprise a small data file with a size of less than 20 bytes. In addition, the server 108 may associate location information such as latitude/longitude, accuracy and confidence information with the provided token. For example, the server 108 may maintain a data structure in its memory which stores a plurality of tokens, each associated with a different respective UE, and location information associated with each of the tokens.

In some embodiments, the token may have a time-to-live (TTL) value. The TTL value may determine that the token is only functional during the time prior to expiration of its TTL value. In some embodiments, the TTL value may supply additional security for the ELS methods described herein. For example, if a UE makes a subsequent emergency call, its TTL value may have expired and it may be given a new token for the subsequent call. As explained in further detail below, the expiration of the TTL value may make it difficult for a second UE to counterfeit the token of the UE. In performing this association, the server 108 may leverage existing technology, such as a "Find My Phone" or "Find My UE" functionality available in some UE devices and some servers (e.g., the "Fine My iPhone" application supported by iCloud).

After the UE receives the token at 506, at 508 the UE may then provide signaling to initiate the outgoing voice call to the emergency system based on the dialed emergency number (e.g. "112") of step 502. The outgoing voice call may contain the key or token that was requested by the UE in 504 and received from the server in 506. In some embodiments, the token may be encapsulated in a calling party SubAddress in a setup message of the outgoing voice call. In other embodiments, the token may be embedded via "User-to-User Signaling" (UUS) Supplementary Service, as defined in 3GPP 24.087, for example. As will become explained below, the call center may then use the received token contained within the incoming emergency voice call to retrieve the location of the UE from the server.

In some cases, the request 504 may fail to reach the server 108. This may occur for a variety of reasons; for example, the server may be temporarily down, or communication between the UE and the server may be obstructed for some other reason. In these cases, because of the presumed urgency of the emergency call, it may be desirable for the method to proceed with steps 508-512 if it does not receive a token 506 within a predetermined period of time after requesting the token at 504. If the predetermined period of time, which may be a preconfigured period of time, expires after requesting a token without receiving a response from the server, the UE may configured to proceed immediately to step 508. In some embodiments, if the UE already had a token, the UE may be configured to send this token to the call center 110. In other embodiments, the UE may be configured to send its location information directly to the call center in 508, instead of sending a token.

In some embodiments, in 510 the call center may then provide a request with the token received in 508 to the server 108. In some embodiments, the call center may be configured to use an application programming interface (API) that is compatible with an API that is used by the server 108. For example, the call center may be configured to communicate with the server using a representational state transfer (ReSTful) API, which may be compatible with the cloud API specification of the server 108.

In response, the server, upon receipt of the token, may determine appropriate location data associated with the token, and at 512, the server may provide a response to the call center including the location data.

In some embodiments, the UE may be configured to update its location with the server 108 in real time. As a result, during the voice call with the call center, the server may continually update its location information for the UE, and the server may respond to the call center in real time with the updated location information. For example, if the caller is in a moving car or bus, the location information initially provided to the call center may not remain valid. In this case, it may be beneficial for the server to send the call center updated location information in real time as it is received by the server from the UE.

Where UE devices are required to operate using older, legacy networks (e.g., UE devices that utilize a 2G cellular network), the UE may be incapable of communicating with the server 108 while it is engaged in a voice call with the call center 110. For example, a UE functioning on a 2G network may discontinue cellular data communications with the server 108 once the voice call with the call center is initiated. In these instances, the ability to receive a token from the server, as well as the functionality of real-time location updates during the call (described above), may be compromised. Here it may be desirable for the UE to calculate a coarse location in a brief time window following the dialing of the emergency number. The brief time window may be of a configurable duration, such as to accomplish a preferred balance between accuracy of the coarse location and latency in initiating the call. The UE may be configured to communicate the coarse location, with or without the token, to the call center upon initiation of the emergency call. The coarse location may be embedded in the setup message of the call, in a manner similar to the embedding of the token described above. Alternatively, the UE may provide the coarse location to the server and receive a corresponding token, and then provide this token to the call center as described in FIG. 5. Example operation of a UE in a 2G scenario is discussed in greater detail with respect to FIG. 10.

Other implementations of emergency location-based services may be subject to 'spoofing', whereby a first UE may be configured to place an emergency call to a call center, wherein the call is configured to appear to the call center as originating from a different, second UE. Pranks of this nature may present a drain on emergency responder resources, and may hinder the effectiveness of emergency response. Embodiments presented above may protect a call center from being victimized by spoofing, as use of a token and expiration of the time-to-live of the token may make it difficult for another UE to counterfeit a token before the time-to-live has expired. For example, a phone number associated with a UE may remain unchanged for extended periods of time and may be easily counterfeited, but it may be very difficult to obtain a valid token to use in a counterfeit emergency call during the time window between initiation of a (valid) emergency call, and expiration of the time-to-live of the token associated with the valid call.

Figure 6:
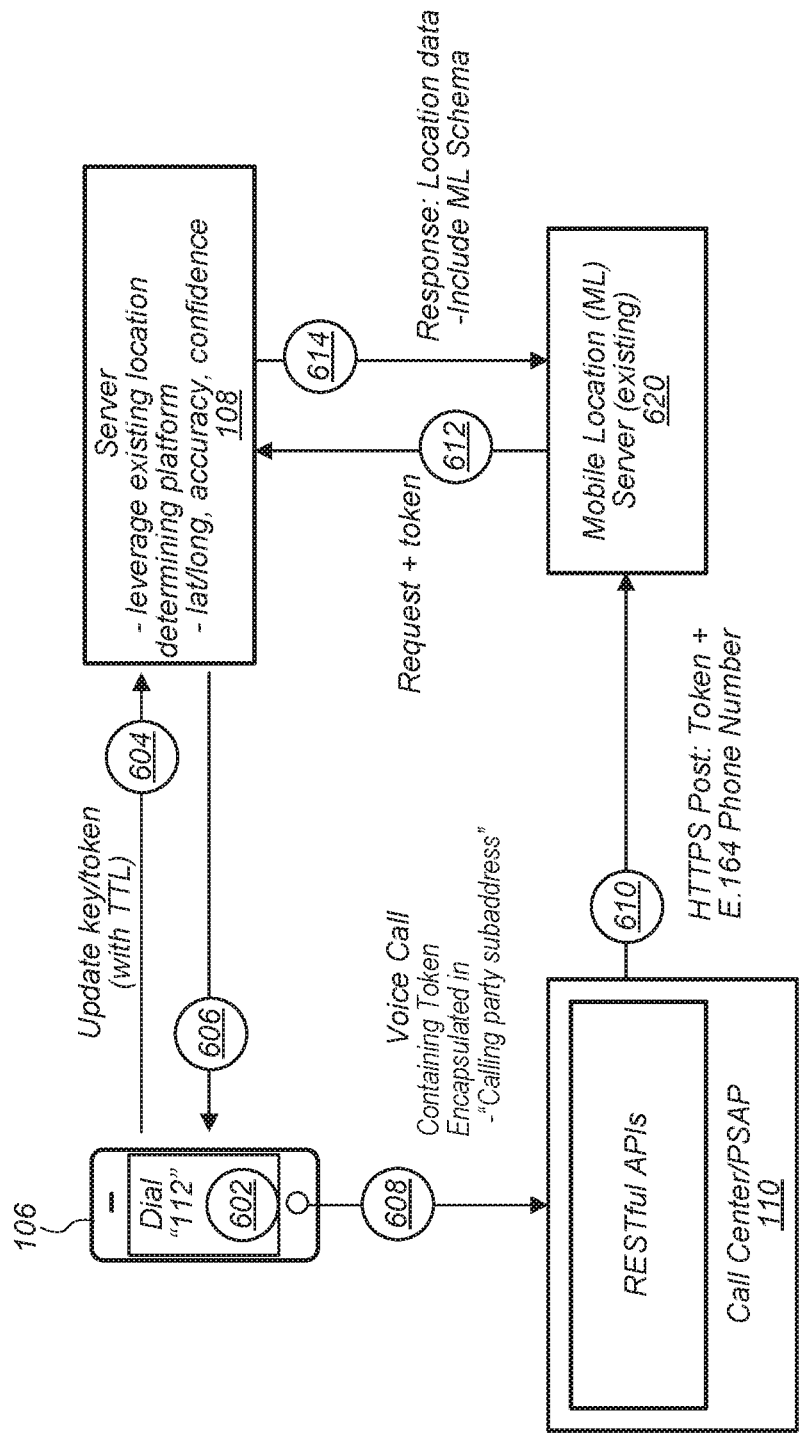
FIG. 6 is a flow diagram illustrating an exemplary method by which an emergency call center obtains location information of a mobile device using an advanced mobile location (AML) server, according to some embodiments.

FIG. 6—Flow Diagram for Performing Emergency Location Service Using a Mobile Location Server FIG. 6 is a flow diagram illustrating an exemplary method for performing emergency location services (ELS) using a mobile location (ML) server, according to some embodiments. In some embodiments, a mobile location server may be an advanced mobile location (AML) server that is presently deployed or under development in various countries. Some countries presently employ AML servers to provide emergency location services. However, in many cases, these technologies employ SMS messaging which has poor security properties and may not be capable of real time location updates during the emergency call. The methods proposed in FIG. 6 explain an embodiment of the present invention wherein existing ML server infrastructure is leveraged to provide improved emergency location services.

At 602, the user of the UE 106 may dial an emergency number on a cell phone (e.g., "112" in India). In response to the user dialing the emergency number, at 604, the UE 106 may request a token, or an updated token, from the server 108. The server 108 may be a cloud platform, such as the iCloud platform, or another kind of server. In other embodiments, the UE may be configured to periodically obtain a token, independent of initiation of an emergency call. In these embodiments, the method may proceed directly to 608 without performing 604 and 606.

In some embodiments, the request 604 may additionally provide to the server location information for the UE, which may comprise latitude and longitude coordinates, accuracy, and confidence information. In other embodiments, the location information for the UE may be provided to the server separately from the methods described herein. For example, an independent application running on the UE (e.g., "Find My Phone", or some other application), may be configured to periodically transmit location information of the UE to the server 108, independent of the dialing of an emergency call 602. In some embodiments, the location information of the UE may have been obtained by UE prior to 604, using a global navigational satellite systems technology, base station triangulation, or some other means of determining location. In other embodiments, the location information may be obtained by the UE in response to the dialing of the emergency call 602.

In response to the request made by the UE at 604, at 606, the server 108 may provide a token, which may involve updating a previous token. The token, which may also be referred to as a 'key', may comprise a short series of bits (less than 20 bytes) that may be generated by the server. The token may further comprise a unique identifier associated with the UE, or with a user account associated with the UE (e.g., a user cloud service account associated with the UE). The token may comprise a small data file with a size of less than 20 bytes. In addition, the server 108 may associate location information such as latitude/longitude, accuracy and confidence information with the provided token.

In some embodiments, the token may have a time-to-live (TTL) value. The TTL value may determine that the token is only functional during the time prior to expiration of its TTL value. In some embodiments, the TTL value may supply additional security for the ELS methods described herein. For example, if a UE makes a subsequent emergency call, its TTL value may have expired and it may be given a new token for the subsequent call. As explained in further detail below, the expiration of the TTL value may make it difficult for a second UE to counterfeit the token of the UE. In performing this association, the server 108 may leverage existing technology, such as a "Find My Phone" or "Find My UE" functionality available in some UE devices and some servers (e.g., the "Fine My iPhone" application supported by iCloud).

After the UE receives the token at 606, at 608, the UE may then provide signaling to initiate an outgoing voice call to the emergency system based on the dialed emergency number (e.g. "112") of step 602. The outgoing voice call may contain the key or token that was requested by the UE in 604 and received from the server in 606. In some embodiments, the token may be encapsulated in a calling party SubAddress in a setup message of the outgoing voice call. In other embodiments, the token may be embedded via "User-to-User Signaling" (UUS) Supplementary Service, as defined in 3GPP 24.087, for example. As will be explained below, the call center may then use the received token contained within the incoming voice call to retrieve the location of the UE.

In some cases, the request 604 may fail to reach the server 108. This may occur for a variety of reasons; for example, the server may be temporarily down, or communication between the UE and the server may be obstructed for some other reason. In these cases, because of the potential urgency of the emergency call, it may be desirable for the method to proceed with steps 608-614 if it does not receive a token 606 within a predetermined period of time after requesting the token at 604. If the predetermined period of time, which may be a preconfigured period of time, expires after requesting a token without receiving a response from the server, the UE may configured to proceed immediately to step 608. In some embodiments, if the UE already had a token, the UE may be configured to send this token to the call center 110. In other embodiments, the UE may be configured to send its location information directly to the call center in 608, instead of sending a token.

In some embodiments, in 610, the call center (which may be an emergency call center or a PSAP) may then provide a request with the token received in 608 and the phone number of the caller to the ML server 620. The request may be provided over an HTTPS post, or by another means. In some embodiments, the call center may be configured to use an application programming interface (API) that is compatible with an API that is used by the server 108. For example, the call center may be configured to communicate with the server using a representational state transfer (ReSTful) API, which may be compatible with the cloud API specification of the server 108. In response, the ML server 620, may send a request and the received token to the server 108. The server 108 may then determine appropriate location data associated with the token, and at 612, the server may provide a response to the ML server 620 including the location data. The server 108 may be configured to send the location data to the ML server using an ML schema that is readable by the ML server, in some embodiments.

In some older UE devices (e.g., UE devices that operate using a 2G cellular technology protocol), the UE may be incapable of communicating with the server 108 while it is engaged in a voice call with the call center 110. For example, a UE functioning on 2G technology may discontinue communications with the server 108 once the voice call with the call center is initiated. For these devices, the functionality of real-time location updates during the call (described above) may be compromised. For these devices, it may be desirable for the UE to calculate a course location in a brief time window following the dialing of the emergency number. The brief time window may be of a configurable duration, such as to accomplish a preferred balance between accuracy of the coarse location and latency in initiating the call. The UE may be configured to communicate the coarse location, with or without the token, to the call center upon initiation of the emergency call. The coarse location may be embedded in the setup message of the call, in a manner similar to the embedding of the token described above.

Figure 7:
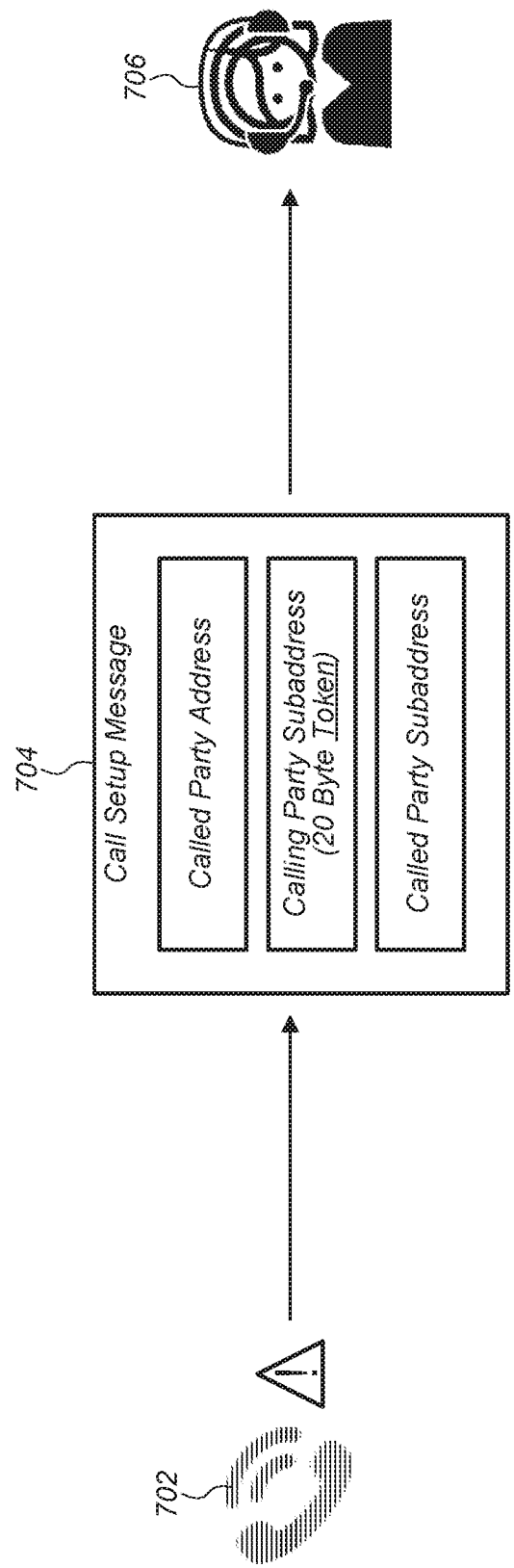
FIG. 7 illustrates an example call setup message for enabling emergency location services, according to some embodiments.

FIG. 7—Example Call Setup Message

FIG. 7 illustrates an exemplary call setup message, according to some embodiments of the present invention.

At 702, a UE initiates a call (which may be an emergency call) to a call center (which may be an emergency call center or a public-safety answering point (PSAP). The call is initiated with a call setup message 704. The call setup message 704 may comprise the called party address, a calling party subaddress, as well as the called party subaddress. The calling party subaddress may comprise a token (explained above) associated with the calling UE, or associated with an account associated with the calling UE, which may have a size of 20 bytes or less.

At 706, the call setup message with the embedded token may be received by an operator at the call center.

Figure 8:
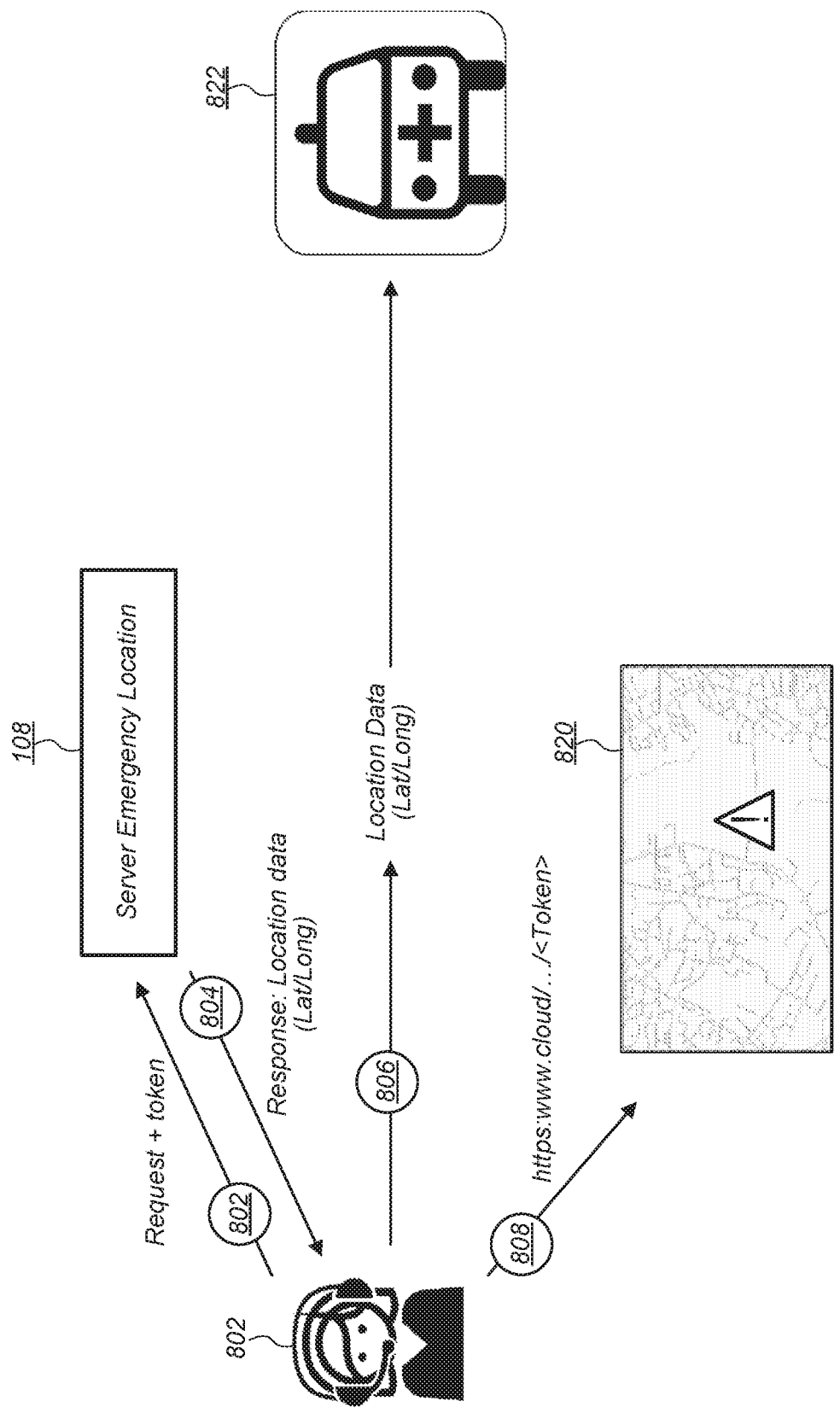
FIG. 8 illustrates an example method by which an emergency call center obtains a caller's location information and transmits the information to a responder, according to some embodiments.

FIG. 8—Example Method for Obtaining and Transmitting Caller Location Information FIG. 8 illustrates a method whereby an operator at an emergency call center obtains location data for a caller, and transmits the location data to a responder.

In some embodiments, at 802, the operator may transmit a request for location data and a token to the server 108. The token may have been received from a UE that initiated an emergency call with the call center.

At 804, in response to receipt of the request and token, the server 108 may respond with location data associated with the token (e.g., latitude/longitude, accuracy, and/or confidence information). Upon receipt of the location data, at 806, the call center may transmit the location data to responders (e.g., Emergency Medical Services (EMS) responders, police, fire department, etc.).

Additionally or alternatively, at 808 the call center may transmit the location data associated with the token to a website, where the location data may be displayed on a graphical interface (e.g., a map or other graphical interface). If the responders have access to the Internet, or otherwise are able to access the website, they may be able to display the graphical interface with the location data displayed. In other embodiments, the call center may enter a unique Universal Record Locator (URL) that is derivable from the token into a web browser. The server 108 may be configured to generate a webpage linked by the unique URL for each token that has been requested by a UE. The URL may display a graphical interface that shows a map with the location associated with the token displayed. In these embodiments, the call center and the responders may be able to access the location of the calling party without having to explicitly request and receive location information from the server (i.e., the method may be accomplished without steps 802 and 804). In other words, the server 108 may upload a map with the location information to the Internet, and the call center and/or the responder(s) may be able to access this map directly from the Internet using a browser, once the call center has obtained the token.

Note that in some embodiments, each or any of steps 802-808 may be configured to proceed automatically upon receipt of a token during an emergency call. For example, automatic execution of steps 802-808 may decrease the time delay between receipt of an emergency call and response to the emergency call by emergency responders. In other embodiments, any of steps 802-808 may be initiated manually by the operator of the call center. For example, as one nonlimiting example, it may be desirable to only notify the responders if it is deemed necessary by the operator for the responders to deploy to the location of the caller.

Figure 9:
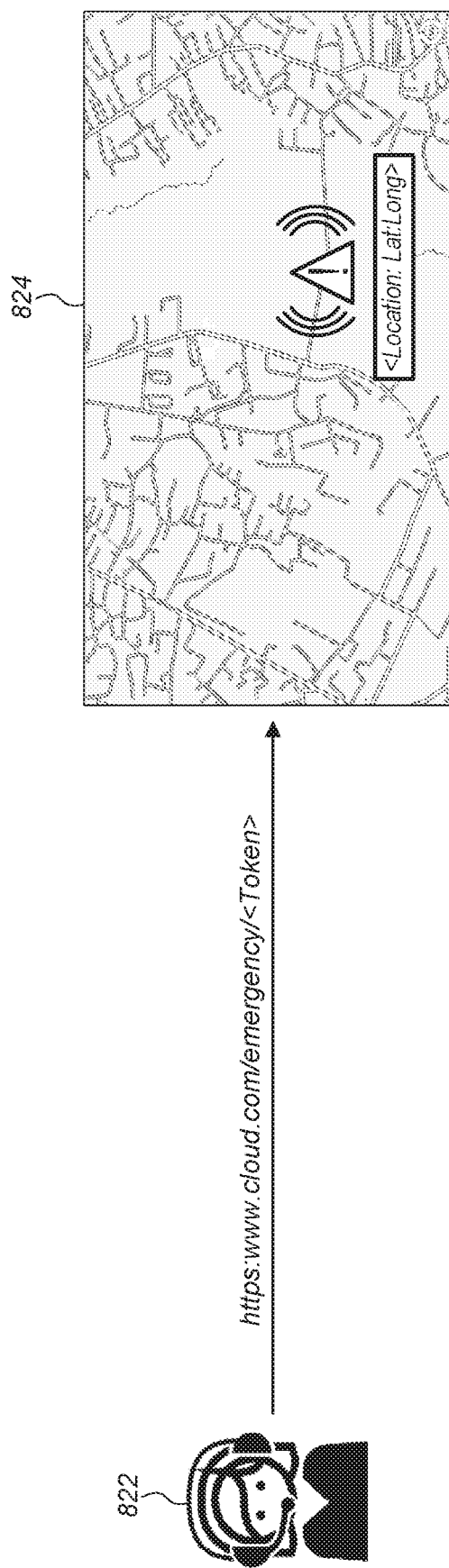
FIG. 9 illustrates an example method by which an emergency call center accesses a URL to render a map with caller location, according to some embodiments.

FIG. 9—Example Method to Render a Map with Caller Location

FIG. 9 illustrates a method by which an emergency call center accesses a URL to render a map with caller location, according to some embodiments.

A computing device 822 at the call center may be configured to bring up a browser using a unique universal resource locator (URL) that contains a token received from an incoming call. The server 108 may be preconfigured to generate a webpage accessible by the unique URL each time a UE requests a token, and the server may graphically indicate the location associated with the respective token on a map on the webpage. The unique URL may render a map image 824 on the browser that focuses on the caller's location. In some embodiments, latitude and longitude information may be superimposed on to the map image.

Figure 10:
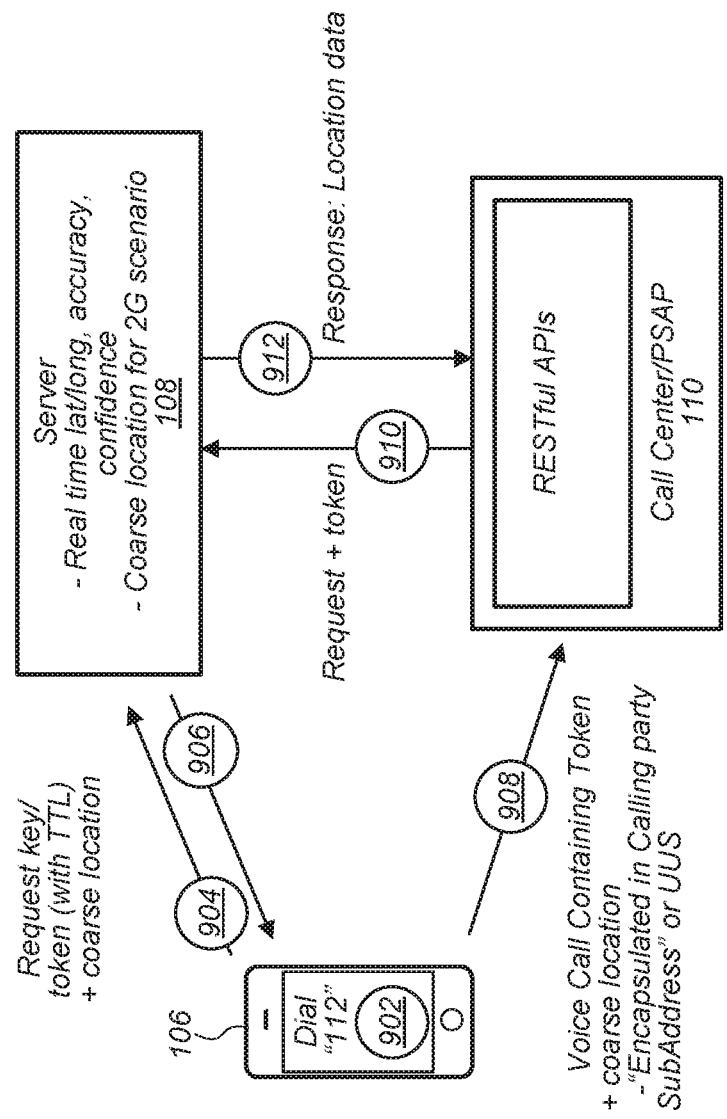
FIG. 10 is a flow diagram illustrating an exemplary method by which an emergency call center obtains location information of a mobile device in a 2G scenario, according to some embodiments.

FIG. 10—Example Call Flow in a 2G Scenario

As noted above, where UE devices are required to operate using older, legacy networks (e.g., UE devices that utilize a 2G cellular network), the UE may be incapable of communicating with the server 108 while it is engaged in a voice call with the call center 110. In other words, in a 2G network scenario the UE may not have voice and data connectivity simultaneously. For example, a UE functioning on a 2G network may discontinue cellular data communications with the server 108 once the voice call with the call center is initiated. In these instances, the ability to receive a token from the server, as well as the functionality of real-time location updates during the call (described above), may be compromised.

Where a UE is operating on an older legacy network, such as a 2G network, the call flow may occur as shown in FIG. 10. As shown, the call flow may be somewhat similar to that shown in FIG. 5. In 902 the user of the UE 106 may dial an emergency number on the UE, as described above with respect to 502 in FIG. 5. In 904 the UE may calculate a coarse location in a brief time window following the dialing of the emergency number. The brief time window may be of a configurable duration, such as to accomplish a preferred balance between accuracy of the coarse location and latency in initiating the call. Upon initiation of the emergency call in 902, in 904 the UE may be configured to communicate the coarse location to the server 108 while requesting a token update. The provision of the coarse location in 904 to the server while requesting a token update may occur prior to voice call establishment.

In 906 the UE may receive a token from the server 108. Here the received token may correspond to the coarse location stored in the cloud server. Operation may then proceed similarly to that described above in FIG. 5.

In 908 one or more of the token and/or the coarse location may be embedded in the setup message of the call provided to the call center, in a manner similar to the embedding of the token described above. In some embodiments, such as when UUS signaling is used, both the token and the coarse location may be embedded in the setup message of the call provided to the call center. When using encapsulation in the calling party sub-address, only the token may be embedded in the setup message of the call, where the token is associated with the coarse location previously provided to and stored in the server 108. Here the call center 110 can use the token to request the coarse location from the server in 910, where the server provides a response to the call center containing the coarse location data in 912. The request/response in 910 and 912 may take the form of a URL that accesses a website containing the location data, as described above. In other embodiments, in 908 the token and/or the coarse location (e.g., both the token and the coarse location) are provided in the call signaling to the call center.

In the call flow of FIG. 5 described above, the coarse location is provided by the UE as part of the call signaling. For example, the UUS transmission method (approx. 130 bytes) may be able to accommodate both the token and coarse location coordinates, and thus both of these may be sent in the call signaling to the call center using UUS. When using encapsulation in the calling party sub-address, the signaling is not able to accommodate both due to space limitations. Calling party sub-address encapsulation may only be able to accommodate a token, and thus in this instance it is desirable for the UE to update the server with the coarse location in 904. This allows the call center to use the token to request the coarse location stored in the server, as shown in 910 and 912.

The above operation may provide a number of benefits. Unlike 3G/LTE systems, 2G scenarios do not allow the UE to provide or update the server with location information after call establishment. By providing a coarse location (if available) prior to establishment in 2G scenarios, the method is still able to provide location information to the call center (PSAP). In many parts of the emerging world, carriers still rely on 2G connectivity. Hence this special handling is valuable for enabling location services in emergency calling for many parts of the world that currently lack this feature.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a radio, comprising one or more antennas configured for wireless communication;
a cellular modem operably coupled to the radio; and
a processing element operably coupled to the radio;
wherein the UE device is configured to:
provide signaling to initiate an outgoing telephone call to an emergency call center;
encapsulate a token in a calling party sub-address field of the outgoing telephone call; and
provide the token during the signaling, wherein the token is associated with location information of the UE device stored on a server computer, and wherein the token is configured for use by the emergency call center to retrieve the location information of the UE device from the server computer.

2. The wireless UE device of claim 1, wherein the token is transmitted using a user-to-user signal supplementary service.

3. The wireless UE device of claim 1, wherein the UE device is configured to request the token from the server computer.

4. The wireless UE device of claim 1, wherein the UE device is configured to provide the location information to the server computer.

5. The wireless UE device of claim 1, wherein the UE device is configured to periodically provide location information to the server computer during the outgoing telephone call to the emergency call center.

6. The wireless UE device of claim 1, wherein the token uniquely identifies the UE device.

7. The wireless UE device of claim 1, wherein the token uniquely identifies a user cloud service account associated with the UE device.

8. A method of handling an incoming emergency call at an emergency call center, the method comprising:
receiving an incoming emergency call from a UE device over a cellular network, wherein said receiving comprises receiving a token from the UE device, wherein the token is associated with location information of the UE device stored on a server computer, and wherein the token is encapsulated by the UE device in a calling party sub-address field of the incoming emergency call;
requesting the location information from the server using the token; and
receiving the location information from the server computer based on the requesting, wherein the received location information is useable to determine a location of the UE device from which the incoming emergency call was received.

9. The method of claim 8, further comprising:
displaying the received location information on a display device after said receiving.

10. The method of claim 8,
wherein the receiving the location information comprises:
creating a uniform resource locator comprising the token, wherein the URL specifies a webpage configured to display a map including the location information.

11. The method of claim 8, further comprising:
the call center transmitting the location of the UE device to an emergency responder.

12. The method of claim 8,
wherein the requesting the location information from the server using the token comprises providing the token to a mobile location server for provision to the server;
wherein the receiving the location information from the server comprises receiving the location information from the server via the mobile location server.

13. The method of claim 8,
wherein the server is a cloud server which provides cloud based services to the UE device.

14. The method of claim 8,
wherein said receiving the incoming call further comprises receiving a telephone number of the UE device;
wherein the method further comprises sending the telephone number of the UE device to the server for comparison with the token to determine integrity of the token.

15. A non-transitory computer accessible memory medium storing program instructions executable by a processor, wherein the program instructions are executable to:
store location information of the UE device;
generate and store a token associated with a user equipment (UE) device, wherein the token identifies the UE device;
provide the token to the UE device for encapsulation by the UE device within a calling party sub-address field of a telephone call to a call center;
receive the token from the call center in response to the UE device making the telephone call to the call center;
provide the location information to the call center in response to the token being received from the call center.

16. The non-transitory computer accessible memory medium of claim 15,
wherein the program instructions are executable to generate and store the token in response to a request by the UE device, wherein the request by the UE device is made in response to an emergency telephone call initiated by the UE device.

17. The non-transitory computer accessible memory medium of claim 15, wherein, in providing the location information to the call center, the program instructions are further executable to generate a webpage including the location information, wherein the webpage is accessible to the call center.

18. The non-transitory computer accessible memory medium of claim 17,
wherein, in generating the webpage, the program instructions are further executable to generate a uniform resource locator (URL) comprising the token, wherein the webpage is accessible through the URL, wherein the webpage comprises a map which specifies a location of the UE device in the map based on the location information.

19. The non-transitory computer accessible memory medium of claim 15,
wherein the program instructions are comprised in a cloud server; and
wherein the token uniquely identifies a user cloud service account maintained on the cloud server that is associated with the UE device.

20. The non-transitory computer accessible memory medium of claim 15, wherein the program instructions are further executable to:
receive a telephone number of the UE device from the call center for comparison with the token to determine integrity of the token.

* * * * *